United States Patent [19]

Akatsuka et al.

[11] Patent Number: 4,784,467
[45] Date of Patent: Nov. 15, 1988

[54] MULTI-LAYERED ANTI-REFLECTION COATING

[75] Inventors: Sadao Akatsuka, Toyohashi; Hakuzo Tani, Takatsuki, both of Japan

[73] Assignee: Minolta Camera Kabushiki Kaisha, Osaka, Japan

[21] Appl. No.: 14,285

[22] Filed: Feb. 13, 1987

[30] Foreign Application Priority Data

Feb. 18, 1986 [JP] Japan .................... 61-34885

[51] Int. Cl.$^4$ ............. G02B 5/28; G02B 1/10
[52] U.S. Cl. ..................... 350/166; 350/164
[58] Field of Search ............. 350/164, 166, 438, 439, 350/444, 642

[56] References Cited

U.S. PATENT DOCUMENTS

| | | | |
|---|---|---|---|
| 3,432,225 | 3/1969 | Rock | 350/164 |
| 3,604,784 | 9/1971 | Louderback | 350/164 |
| 3,781,090 | 12/1973 | Sumita | 350/164 |
| 3,858,965 | 1/1975 | Sumita | 350/164 |
| 3,922,068 | 11/1975 | Uetsuki | 350/164 |
| 3,934,961 | 1/1976 | Itoh et al. | 350/164 |
| 4,313,647 | 2/1982 | Takazawa | 350/164 |
| 4,387,960 | 6/1983 | Tani | 350/164 |
| 4,497,539 | 2/1985 | Sakurai et al. | 350/164 |

*Primary Examiner*—John K. Corbin
*Assistant Examiner*—Martin Lerner
*Attorney, Agent, or Firm*—Price, Gess & Ubell

[57] ABSTRACT

A multi-layered anti-reflection coating for use with a plastic substrate is provided. The coating consists of four layers and has high durability. The first layer furthest from the substrate is made of $SiO_2$; the second layer is made of a mixture of $ZrO_2$ and $TiO_2$; the third layer is made of $ZrO_2$; and the fourth layer is made of $SiO$ or $SiO_2$. The optical thicknesses of the first to third layers are about $0.25\lambda$ with respect to a design wavelength $\lambda$, respectively. However the optical thickness of the fourth layer is greater than that of the respective first to third layers and selected between $0.5\lambda$ to $2.0\lambda$.

7 Claims, 3 Drawing Sheets

MULTI-LAYERED ANTI-REFLECTION COATING

BACKGROUND OF THE INVENTION

1. Field of the Invention

The present invention relates to multi-layered anti-reflection coating to be applied to a substrate, and more particularly to an anti-reflection coating for use with a plastic substrate to reduce reflectance of light.

2. Description of the Prior Art

A double-layered anti-reflection coating for use with a plastic substrate has been proposed in Japanese Laid-Open Patent Publication No. 56-110901. The coating comprises a first layer furthest from the substrate made of $MgF_2$ and having an optical thickness of $\lambda/4$, and a second layer made of $Al_2O_3$ and having an optical thickness of $\lambda/16$, wherein $\lambda$ represents a design wavelength.

Although the above coating provides sufficient reflectance reducing effect, however, its durability is not sufficient for practical use. Therefore, if the coating is applied to an outer surface exposed to the outside of the device, for example, to an outer surface of an eyepiece lens element of a finder optical system, its optical performance may be deteriorated as time goes on.

SUMMARY OF THE INVENTION

An object of the present invention is to provide a multi-layered anti-reflection coating for use with a plastic substrate which has a high durability in comparison with the conventional coating.

The other object of the present invention is to provide a multi-layered anti-reflection coating for use with a plastic substrate which includes four layers determined in a new design.

In order to achieve the above described objects, the multi-layered anti-reflection coating according to the present invention is characterized in that a thick fourth layer made of SiO or $SiO_2$ is provided on the substrate in contact therewith, because of its good resistance to the effects of humidity and physical scratches and its good adhesion to the plastic substrate; and in that two high index layers and one low index layer are provided on the fourth layer alternatively, the refractive indices and optical thicknesses of each layer being determined in accordance with the refractive index of the fourth layer and the optical thickness thereof.

The features of the present invention which are believed to be novel are set forth with particularly in the appended claims. The present invention, both as to its organization and manner of operation, together with further objects and advantages thereof, may be best understood by reference to the following description, taken in conjunction with the accompanying drawings.

DETAILED DESCRIPTION OF THE PREFERRED EMBODIMENTS

The following specification, taken in conjunction with the drawings, set forth the preferred embodiments of the present invention in such a manner that any person skilled in the optical field can use the invention. The embodiments of the invention disclosed herein are the best modes contemplated by the inventors for carrying out their invention in a commercial environment, although it should be understood that various modifications can be accomplished within the parameters of the present invention.

Figure 1:
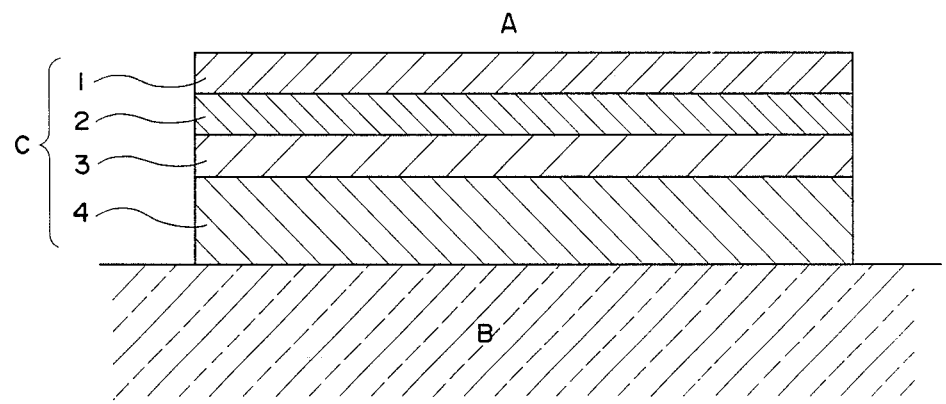
FIG. 1 is a schematic cross sectional view of anti-reflection coating according to embodiments of the present invention.
Figure 2:
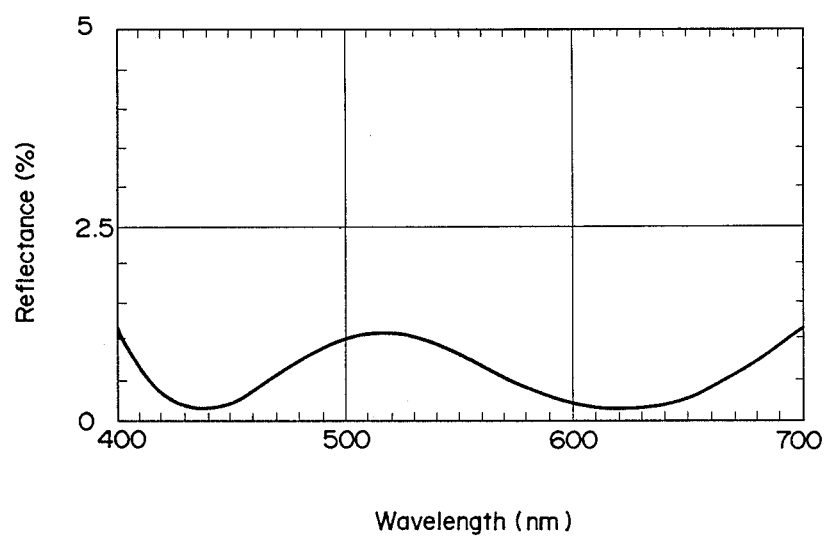
FIG. 2 is a reflectance graph for the embodiment 1.
Figure 3:
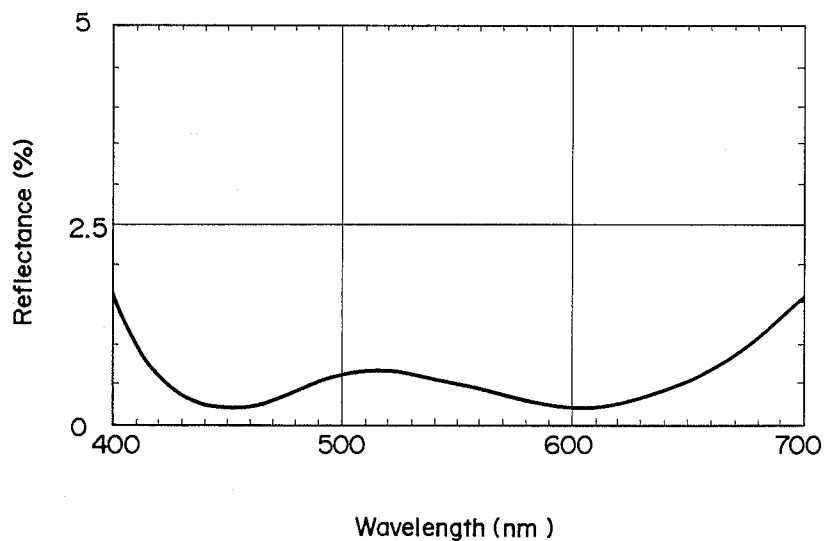
FIG. 3 is a reflectance graph for the embodiment 2.
Figure 4:
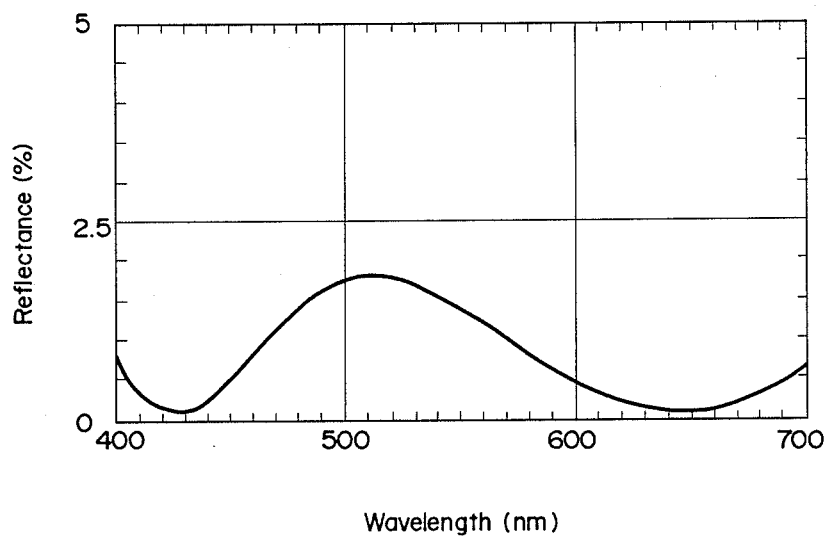
FIG. 4 is a reflectance graph for the embodiment 3.
Figure 5:
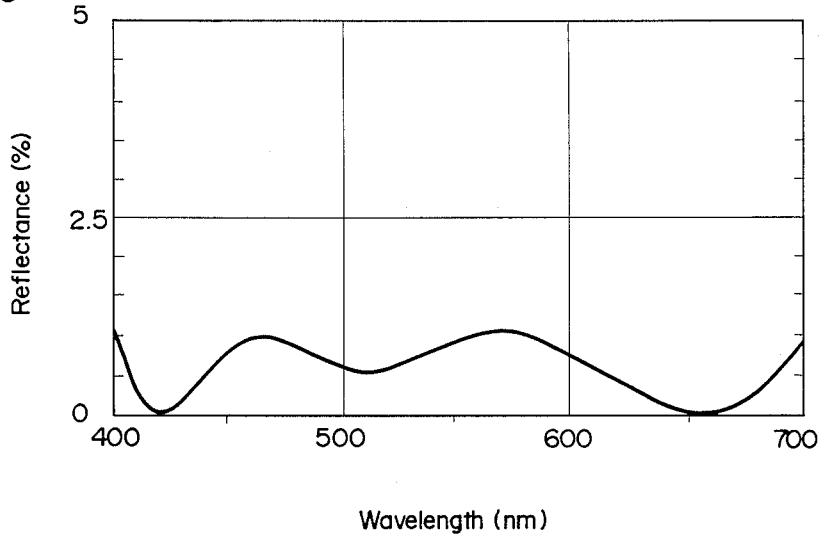
FIG. 5 is a reflectance graph for the embodiment 4.
Figure 6:
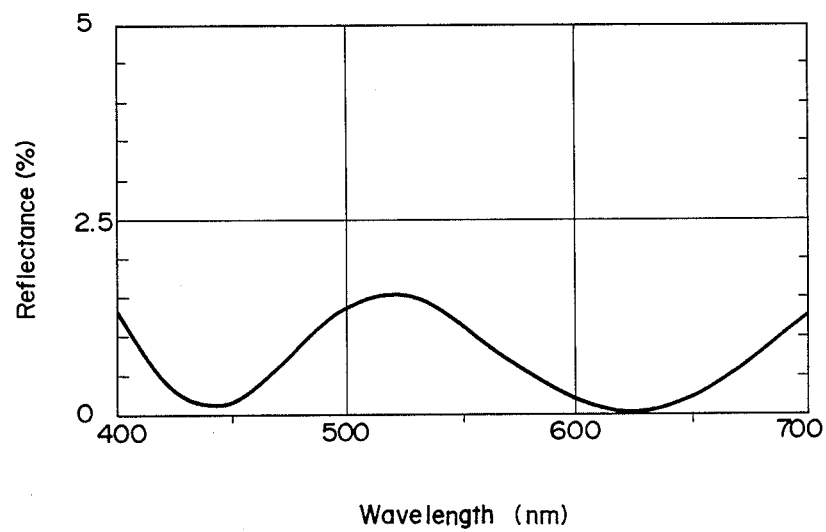
FIG. 6 is a reflectance graph for the embodiment 5.

Referring to FIG. 1, a schematic cross-sectional view of the structure of the anti-reflection coating of the present invention is disclosed. An anti-reflection coating C is applied to the surface of a substrate B such as a plastic with the outermost layer being adjacent an air medium A. The anti-reflection coating C shown in FIG. 1 comprises a first layer 1 furthest from the substrate B, a second layer 2, a third layer 3, and, a fourth layer 4, in sequence from the air side to the substrate side.

The first layer 1 is made of $SiO_2$ and has an optical thickness of about 0.25 $\lambda$ with respect to a design wavelength $\lambda$ selected within a wavelength range of 400 nanometers (nm) to 700 nanometers (nm). The second layer 2 is made of a mixture of $ZrO_2$ and $TiO_2$ and has an optical thickness of about 0.25 $\lambda$. The third layer 3 is made of $ZrO_2$ and has an optical thickness of about 0.25 $\lambda$. The fourth layer 4 is made of SiO or $SiO_2$ and has an optical thickness selected between 0.5 $\lambda$ to 2.0 $\lambda$.

The optical thicknesses of respective layers are set to optimum values so that a sufficient anti-reflection effect may be obtained for a particular substrate B by applying a known method, for example, disclosed in U.S. Pat. No. 4,387,960.

In the construction as described above, the following conditions would be effective for reducing the reflectance in order to obtain an anti-reflection effect:

$$0.22\lambda < n_1 d_1 < 0.28\lambda \quad (1)$$

$$0.22\lambda < n_2 d_2 < 0.28\lambda \quad (2)$$

$$0.22\lambda < n_3 d_3 < 0.28\lambda \quad (3)$$

$$0.5\lambda < n_4 d_4 < 2.0\lambda \quad (4)$$

$$1.45 < n_1 < 1.52 \quad (5)$$

$$1.80 < n_2 < 2.15 \quad (6)$$

$$1.75 < n_3 < 1.95 \quad (7)$$

$$1.45 < n_4 < 1.6 \quad (8)$$

wherein, $n_1 d_1$ represents an optical thickness of the first layer 1, $n_2 d_2$ represents an optical thickness of the second layer 2, $n_3 d_3$ represents an optical thickness of the third layer 3, $n_4 d_4$ represents an optical thickness of the fourth layer 4, $n_1$ represents a refractive index of the first layer 1, $n_2$ represents a refractive index of the second layer 2, n3 represents a refractive index of the third layer 3, and n4 represents a refractive index of the fourth layer 4.

The above conditions (1) to (8) represent the construction of the present invention, and are effective for improving the anti-reflection effect.

Listed below are definite constructions of various embodiments according to the present invention, in which the design wavelength $\lambda$ is represented by 510 nanometers ( nm ).

The anti-reflection coating is produced by evaporating SiO or $SiO_2$ for the fourth layer 4, $ZrO_2$ for the third layer, a mixture of $ZrO_2$ and $TiO_2$ for the second layer, and $SiO_2$ for the first layer in that order on the surface of the preselected plastic substrate.

The anti-reflection coatings of the embodiments are composed of optically stable and high durable materials for the respective layers, whereby the coatings are optically stable, easy to produce, and durable as a whole.

TABLE 1

| EMBODIMENT 1 | Material | Refractive index | Optical thickness | Vacuum (Torr) |
|---|---|---|---|---|
| First layer | $SiO_2$ | 1.47 | $0.25\lambda$ | $1.5 \times 10^{-4}$ |
| Second layer | Mixture of $ZrO_2$ and $TiO_2$ | 2.00 | $0.25\lambda$ | $5.0 \times 10^{-5}$ |
| Third layer | $ZrO_2$ | 1.84 | $0.25\lambda$ | $2.5 \times 10^{-4}$ |
| Fourth layer | $SiO_2$ | 1.47 | $1.0\lambda$ | $3.0 \times 10^{-4}$ |
| Substrate | acrylic resin | 1.49 | | |

TABLE 2

| EMBODIMENT 2 | Material | Refractive index | Optical thickness | Vacuum (Torr) |
|---|---|---|---|---|
| First layer | $SiO_2$ | 1.47 | $0.25\lambda$ | $1.5 \times 10^{-4}$ |
| Second layer | Mixture of $ZrO_2$ and $TiO_2$ | 2.00 | $0.25\lambda$ | $5.0 \times 10^{-5}$ |
| Third layer | $ZrO_2$ | 1.80 | $0.25\lambda$ | $3.0 \times 10^{-4}$ |
| Fourth layer | $SiO_2$ | 1.47 | $1.0\lambda$ | $3.0 \times 10^{-4}$ |
| Substrate | acrylic resin | 1.49 | | |

TABLE 3

| EMBODIMENT 3 | Material | Refractive index | Optical thickness | Vacuum (Torr) |
|---|---|---|---|---|
| First layer | $SiO_2$ | 1.47 | $0.25\lambda$ | $1.5 \times 10^{-4}$ |
| Second layer | Mixture of $ZrO_2$ and $TiO_2$ | 2.00 | $0.25\lambda$ | $5.0 \times 10^{-5}$ |
| Third layer | $ZrO_2$ | 1.90 | $0.25\lambda$ | $1.0 \times 10^{-4}$ |
| Fourth layer | $SiO_2$ | 1.47 | $1.0\lambda$ | $3.0 \times 10^{-4}$ |
| Substrate | acrylic resin | 1.49 | | |

TABLE 4

| EMBODIMENT 4 | Material | Refractive index | Optical thickness | Vacuum (Torr) |
|---|---|---|---|---|
| First layer | $SiO_2$ | 1.47 | $0.25\lambda$ | $1.5 \times 10^{-4}$ |
| Second layer | Mixture of $ZrO_2$ and $TiO_2$ | 2.00 | $0.25\lambda$ | $5.0 \times 10^{-5}$ |
| Third layer | $ZrO_2$ | 1.84 | $0.25\lambda$ | $2.5 \times 10^{-4}$ |
| Fourth layer | $SiO_2$ | 1.47 | $1.0\lambda$ | $3.0 \times 10^{-4}$ |
| Substrate | polycarbonate | 1.58 | | |

TABLE 5

| EMBODIMENT 5 | Material | Refractive index | Optical thickness | Vacuum (Torr) |
|---|---|---|---|---|
| First layer | $SiO_2$ | 1.47 | $0.25\lambda$ | $1.5 \times 10^{-4}$ |
| Second layer | Mixture of $ZrO_2$ and $TiO_2$ | 2.00 | $0.25\lambda$ | $5.0 \times 10^{-5}$ |
| Third layer | $ZrO_2$ | 1.90 | $0.25\lambda$ | $1.0 \times 10^{-4}$ |
| Fourth layer | $SiO_2$ | 1.47 | $0.8\lambda$ | $3.0 \times 10^{-4}$ |
| Substrate | polycarbonate | 1.58 | | |

In the above TABLES, "Vacuum" represents vacuum when the layer are formed by vacuum deposition.

The anti-reflection coatings according to the above embodiments are manufactured as follows; at first, the fourth layer 4 made of SiO or $SiO_2$ is formed by depositing SiO on the preselected plastic substrate B by means of using the known resistance heating method with a boat made of Mo in the vacuum designating in the respective TABLES; the third layer 3 made of $ZrO_2$ is formed thereon by depositing $ZrO_2$ on the fourth layer 4 by means of using the known electron beam deposition method in the vacuum designating in the respective TABLES; the second layer 2 made of a mixture of $ZrO_2$ and $TiO_2$ is formed thereon by depositing a mixture of $ZrO_2$ and $TiO_2$ on the third layer 3 by means of using the known electron beam deposition method in the vacuum designating in the respective TABLES; and finally, the first layer made of $SiO_2$ is formed thereon by using the same method as used for the fourth layer or by using the known electron beam deposition method.

FIGS. 2 to 6 show the percent of reflectance versus wavelength curves for embodiments 1 to 5 listed in Tables 1 to 5, respectively. Curves in FIGS. 2 to 6 indicate the spectral reflectance characteristics of embodiments 1 to 5, respectively.

The embodiments 1 to 3 are different from each other only on vacuum set when the respective third layer are evaporated. Therefore, the characteristics of the anti-reflection coatings can be changed by modifying the refractive index of the third layer by means of controlling the vacuum used for vacuum deposition of the third layer.

While the preferred embodiments have been disclosed in an enabling manner to facilitate the reproduction of the present invention, it should be realized that various modifications can be easily accomplished by a person skilled in this field, and, accordingly, the present invention should be measured solely from the appending claims.

What is claimed is:

1. A multi-layered anti-reflection coating for use with a plastic substrate to reduce reflectance of light, comprising four layers;
   a first layer made of $SiO_2$ furthest from the substrate;
   a second layer made of a mixture of $ZrO_2$ and $TiO_2$;
   a third layer made of $ZrO_2$; and,
   a fourth layer made of a material selected from a group consisting of SiO and $SiO_2$.

2. A multi-layered anti-reflection coating as claimed in claim 1, wherein the coating fulfills the following conditions:

$$0.22\lambda < n1d1 < 0.28\lambda$$

$$0.22\lambda < n2d2 < 0.28\lambda$$

$$0.22\lambda < n3d3 < 0.28\lambda$$

$0.5\lambda < n_4d_4 < 2.0\lambda$ wherein;

n1d1 represents an optical thickness of the first layer;
n2d2 represents an optical thickness of the second layer;
n3d3 represents an optical thickness of the third layer;
n4d4 represents an optical thickness of the fourth layer; and
$\lambda$ represents a design wavelength.

3. A multi-layered anti-reflection coating as claimed in claim 2, wherein the coating fulfills the following conditions:

$1.45 < n_1 < 1.52$ $1.80 < n_2 < 2.15$ $1.75 < n_3 < 1.95$ $1.45 < n_4 < 1.6$ wherein;

n1 represents a refractive index of the first layer;
n2 represents a refractive index of the second layer;
n3 represents a refractive index of the third layer;
n4 represents a refractive index of the fourth layer.

4. A multi-layered anti-reflection coating as claimed in claim 2, wherein the refractive index of the third layer is selectable by controlling the amount of oxygen gas present during the vacuum evaporation process thereof.

5. A multi-layered anti-reflection coating for use with a plastic substrate to reduce reflectance of light, comprising four layers;

a first layer made of $SiO_2$ furthest from the substrate and having an optical thickness of about $0.25\lambda$;

a second layer made of a mixture of $ZrO_2$ and $TiO_2$ and having an optical thickness of about $0.25\lambda$;

a third layer made of $ZrO_2$ and having an optical thickness of about $0.25\lambda$; and, a fourth layer made of a material selecting a group consisting of SiO and $SiO_2$ and having an optical thickness of $0.5\lambda - 2.0\lambda$;

wherein $\lambda$ represents a design wavelength.

6. A multi-layered anti-reflection coating as claimed in claim 5, wherein the coating fulfills the following conditions:

$0.22\lambda < n_1d_1 < 0.28\lambda$ $0.22\lambda < n_2d_2 < 0.28\lambda$ $0.22\lambda < n_3d_3 < 0.28\lambda$ $0.5\lambda < n_4d_4 < 2.0\lambda$ $1.45 < n_1 < 1.52$ $1.80 < n_2 < 2.15$ $1.75 < n_3 < 1.95$ $1.45 < n_4 < 1.6$ wherein;

n1d1 represents an optical thickness of the first layer;
n2d2 represents an optical thickness of the second layer;
n3d3 represents an optical thickness of the third layer;
n4d4 represents an optical thickness of the fourth layer;
n1 represents a refractive index of the first layer;
n2 represents a refractive index of the second layer;
n3 represents a refractive index of the third layer; and
n4 represents a refractive index of the fourth layer.

7. A multi-layered anti-reflection coating as claimed in claim 6, wherein the refractive index of the third layer is selectable by controlling the amount of oxygen gas present during the vacuum evaporation process thereof.

* * * * *